July 3, 1962  R. M. CHRISTNER  3,041,732
MULTIPLE PURPOSE MEASURING TOOL AND HOLDER THEREFOR
Filed Feb. 21, 1958  2 Sheets-Sheet 1
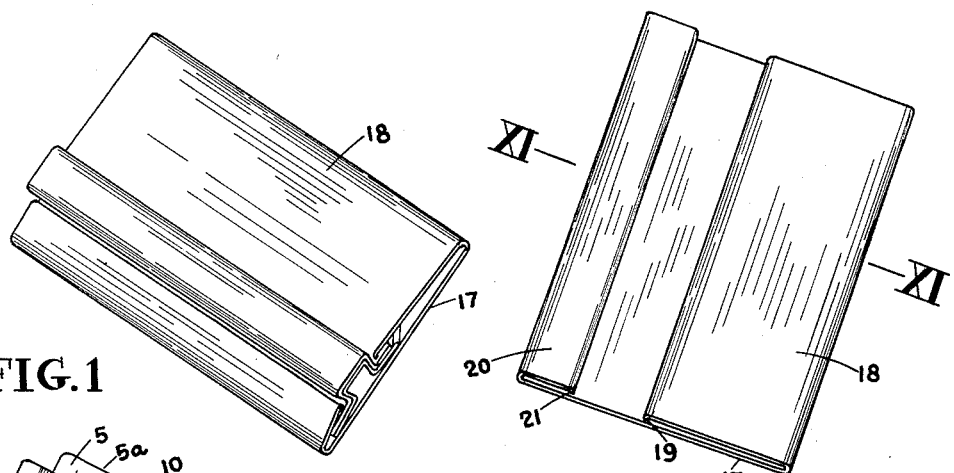
FIG. 1
FIG. 2
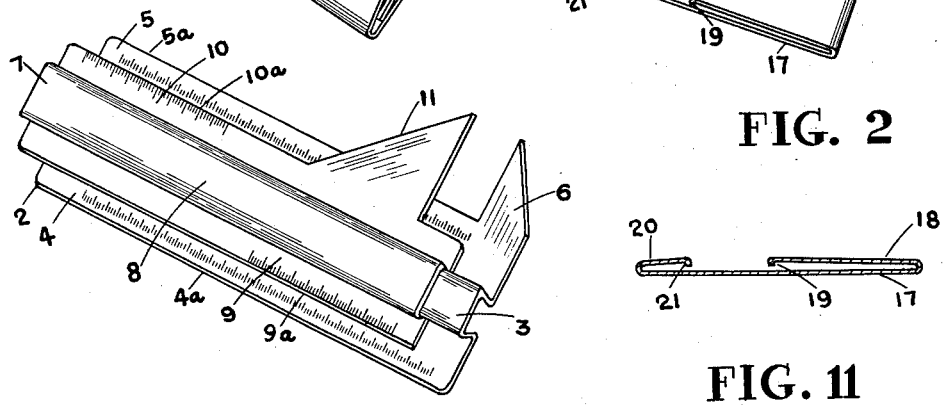
FIG. 3
FIG. 11
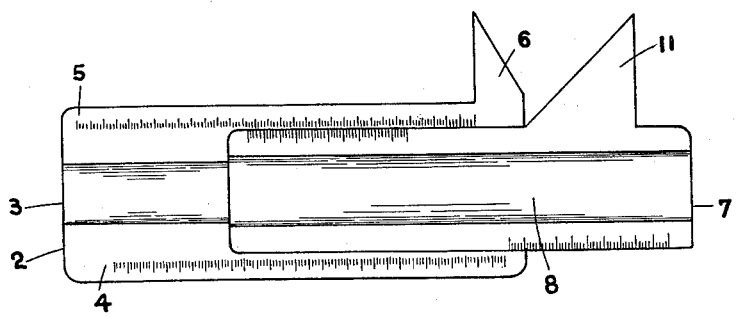
FIG. 4
INVENTOR.
ROBERT M. CHRISTNER July 3, 1962  R. M. CHRISTNER  3,041,732
MULTIPLE PURPOSE MEASURING TOOL AND HOLDER THEREFOR
Filed Feb. 21, 1958  2 Sheets-Sheet 2

INVENTOR.
ROBERT M. CHRISTNER
BY
Christy, Parmelee Strickland
attorneys

United States Patent Office 3,041,732
Patented July 3, 1962

3,041,732
MULTIPLE PURPOSE MEASURING TOOL AND HOLDER THEREFOR
Robert M. Christner, Ben Avon Borough, Pa.
(907 Vermont Ave., Apt. 1, Pittsburgh 34, Pa.)
Filed Feb. 21, 1958, Ser. No. 716,592
3 Claims. (Cl. 33—143)

This invention is for a measuring tool intended for many different uses, and is for a tool in the nature of a combined caliper and divider for inside and outside measuring, but also having utility for many other purposes.

The present invention is primarily of a design and size to enable it to be conveniently carried in one's pocket, but it can be made in various sizes. It will be hereinafter specifically described by way of illustration as a small light-weight instrument of a character designed to be carried on one's person, in a pocket or wallet.

The principal object of my invention is to provide a tool of the character above referred to which is of simple, light-weight, unique and cheap construction, and yet which has a high degree of accuracy and capable of a wider utility than much more expensive tools now available. A further object is to provide a tool and holder therefor into and from which the tool may be inserted, and which enables the tool to be conveniently and safely carried in one's pocket. A further object is to provide a tool of this kind which also itself acts as a holder for another implement forming part of the entire combination.

These and other objects and advantages are secured by my invention, which may be more fully understood by reference to the accompanying drawings, in which:

FIG. 1 is a perspective view of the tool and holder assembly with the parts in position to be carried in the pocket or elsewhere;

FIG. 2 is a perspective view of the casing or holder with the tool removed;

FIG. 3 is a perspective view of the tool removed from the assembly and with the points spread for outside calipering, but with scale markings on the central ridge of the under member omitted to more clearly show the contour, the scale markings being shown in FIG. 5;

FIG. 4 is a plan view of the tool with the points spread for taking inside measurements, but with the scale markings on the central ridge of the under member omitted to better show the combination;

FIG. 11 is a transverse section in the plane of line XI—XI of FIG. 2.

Figure 5:
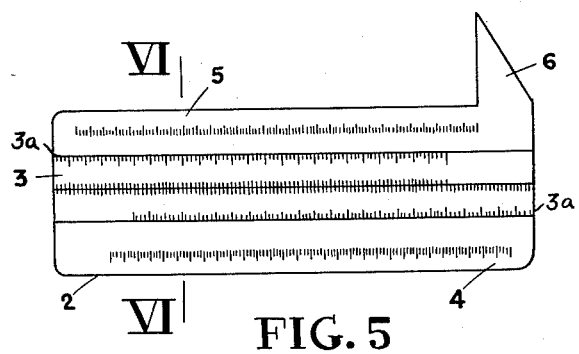
FIG. 5 is a plan view of one member of the tool.
Figure 6:
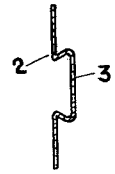
FIG. 6 is a transverse section in the plane of line VI—VI of FIG. 5.

Referring to the drawings, the tool is comprised of two thin sheet metal pieces preferably stamped and shaped from stainless steel of about 26 gauge thickness. One of these pieces 2, is wider than the other. It has a ridge 3 pressed therein throughout its length which has reversely-angled sides so that it is of dove-tail shape, as best shown in FIG. 6. There is a flange 4 at one side of the ridge, and flange 5 at the other side. At one end of the member, the flange 5 is projected outwardly to form a triangular point 6. The inner or left-hand edge of this point as viewed in FIG. 5 is at right angles to the straight outer edge of the flange. The other side edge defines a 30° angle at the point, and 60° at its base.

The other main member of the tool is designated 7, and it, too, has a dovetail ridge 8 extending throughout its length, this ridge being just enough larger than the ridge 3 on the member 2 to provide a telescoping or sliding fit of the two when the ridge 8 is fitted astradle the ridge 3. The member 7 has a flat flange 9 along one edge that slides on the flange 4, and a second flange 10 that slides on the flange 5. The flanges 9 and 10 are narrower than the corresponding flanges of the first member, so that each flange may have a scale therealong as will be hereinafter more fully described.

Figure 7:
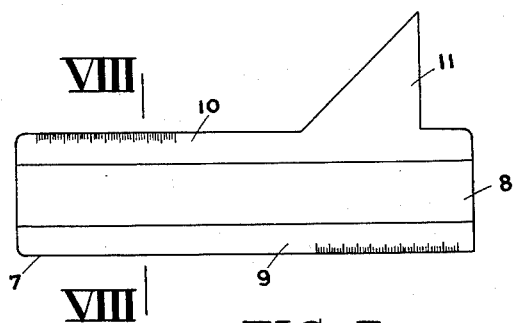
FIG. 7 is a plan view of the other member of the tool.
Figure 8:
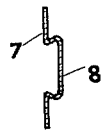
FIG. 8 is a transverse section in the plane of line VIII—VIII of FIG. 7.

Spaced inwardly from one end of the flange 10, the flange merges into a point-forming extension 11, the distance from the right end of the member 7 as viewed in FIG. 7 being equal to the width of the point 6 of the other member at its base. The left edge of the point 11 as viewed in FIG. 7 is at right angles to the straight edge of the flange 10 so that it is parallel with the left edge of the first member. The other edge has a slope from the point to the base of preferably 45°.

When the two members are slidably fitted together, the ends of the two members will be flush when the two points are moved together so that the straight edges of the two points coincide. By sliding one member on the other to the left as viewed in FIG. 3, the points may be moved apart and the device used as an outside divider or caliper. When the parts are moved relatively in the other direction the parallel straight edges of the points will be in opposed relation as shown in FIG. 4, instead of confronting relation as in FIG. 3, and the points may be projected into a crevice, instead of an annulus or pipe, and inside measurements obtained. Since the metal is of very light gauge, the fact that the points are not in the same plane is immaterial except perhaps for some uses where greater precision than is ordinarily required is involved, and if one desires, he may spring the points into the same plane, in which case he must bend them back to enable them to slide past each other.

The top face of the ridge 3 may be graduated with a direct reading scale 3a that may be calibrated in any desired way, as for example from each end toward the middle from 0 at the ends to a measurement at the middle which corresponds to half the overall length of the member 2. On the flange 5 there is a vernier scale 5a that reads in conjunction with a vernier scale 10a on the flange 10. These scales are for use when the points are set to measure an outside dimension, and by their use the tool becomes a proportional divider, as well as a vernier caliper. On the flange 4 there is another vernier scale 4a, and there is a matching scale 9a on the flange 9. These scales, 4a and 9a, are for use in making inside measurements, and provide the same utility as the scales 5a and 10a.

Figure 9:
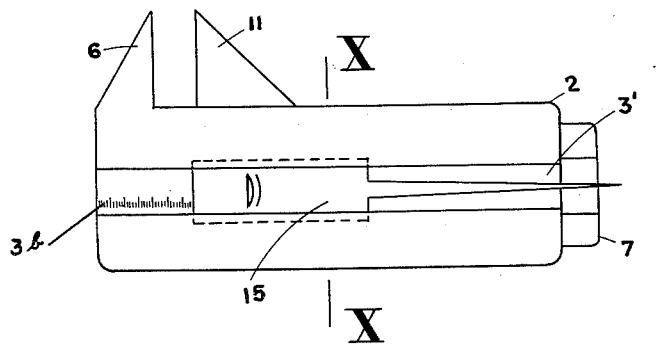
FIG. 9 is a plan view similar to FIG. 4, but showing the opposite face of the tool with a further auxiliary measuring device carried therein.
Figure 10:
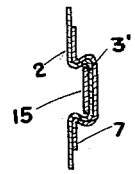
FIG. 10 is a transverse section in the plane of line X—X of FIG. 9.

As best shown in FIGS. 9 and 10, the implement may have further utility by using the inside of the ridge 3, which is a dovetailed channel, as a holder for still another implement. I have shown one such implement in the form of a probe and small orifice measuring tool. It has an end portion 15 of generally rectangular form with its edges inclined to slidably fit in the recess 3' forming the under surface of the ridge. At one end the head or end portion has a probe which is tapered from the head where it is of maximum width to a point. The other end of the head is square and the inner face of the ridge is calibrated in units of length, the scale being indicated as 3b.

The scale 3b, for example, may be calibrated in sixty-fourths of an inch. When the probe is fully retracted, the straight edge of the head is at the 0 markings on scale 3b. If the depth of a cavity is to be measured, the probe is projected as shown in FIG. 9 until its point touches the bottom of the recess. The depth of the recess may be read directly on scale 3b. Moreover, if the probe is for example 2 inches long and has a maximum width of 0.128" at its base and is of uniform taper, and since 2 inches equals 128 sixty-fourths, the probe increases in width one one-thousandth of an inch for each one sixty-fourth of an inch in length. Consequently, if the probe is projected and inserted in a small orifice or opening until it fits the interior of the opening, and the end of the member 2 is brought against the surface in which the opening is formed, the diameter of the opening can be measured in thousandths of an inch, since each increment of one sixty-fourth on scale 3b is equal to one one-thousandth of an increment in the width of the probe.

To enable the tool to be carried about as a pocket piece without injury to the points or damage to one's clothing or person, my invention includes a sheath or housing which is also preferably formed of thin gauge stainless steel. It is best shown in FIG. 2, and comprises an integral piece of sheet metal having a continuous rectangular face panel 17, the length of which is the same as the length of the tool when the points are closed, and the width of which is just slightly greater than the maximum overall width of the tool. One edge of the panel 17 has a fold 18 therealong that is turned over one face of the panel, and is in a plane parallel with the face of the panel. It extends slightly beyond the center of the panel 17 and has a slight lip 19 on its free edge. The other edge of the panel has a similar fold 20 therealong which is narrow as compared to fold 18. Its free edge has a slight inwardly turned lip 21 therealong. The free edges of the two folds are spaced from each other a distance equal to the width of the base of the ridge 8 of the member 7. The distance between the main panel and the overlying folds is slightly greater than the thickness of the tool.

The sheath is used by first bringing the points of the tool together and then sliding the tool with the base of the ridge 8 fitting between lips 19 and 21 of the two folds 18 and 20, respectively. The points at this time are turned in a direction to slide between the panel 17 and the wide fold 18. The sliding movement is continued until the ends of the tool are flush with the ends of the sheath, and only the top portion of ridge 8 is exposed, the points being completely protected. The metal of the sheath has a spring or resilience that maintains a light frictional pressure between the lips 19 and 21 at the base of the ridge 8 so that the tool will not slip from the sheath of its own accord. The lips 19 and 20 also keep the folds 18 and 20 respectively out of contact with the scales on the flanges of the respective tool parts, so that they are not marred or effaced by the sliding of the tool into and out of the sheath.

The tool as described has a wide range of uses in addition to those indicated. Because of the angles on the points, the tool can be used for sketching and laying out angle shapes, while the edges of the tool are straight edges. Each rounded corner may have a different curvature and the straight inner faces of the points enables short parallel lines to be easily drawn. In place of a probe being housed in the groove 3a, some other equally convenient tool may be inserted.

The tool possesses a high degree of accuracy, but nevertheless can be produced in quantity at relatively low cost, since it requires only sheet metal and simple dies and forming operations. All of the calibrations can be etched or otherwise applied to the flat sheet blanks before they are formed.

It will be understood that I have described throughout present preferred embodiments of my invention to secure maximum utility, but various features may be omitted or modified within the spirit of my invention and under the scope of the following claims.

I claim:

1. A measuring instrument of the class described comprising one sheet metal member comprising a rectangular sheet of metal having one straight edge and having a laterally-extending point projecting from the other edge at one end of the sheet, said sheet having a wide flat dove-tailed central ridge on one face coextensive with its full length and forming on the opposite face a channel of dove-tailed section extending the length of said member, a second rectangular sheet metal member of the same length having a pointed extension projecting laterally from one edge, the pointed projection on said second member being spaced inwardly from the end thereof, the second member also having a similarly-shaped wide flat central dove-tailed ridge formed on one face thereof coextensive with its length with a corresponding channel of dovetailed section being formed in its other face, the ridge of the first member being contoured to the same shape as the contour of the channel of the second member and being slidably fitted therein, the pointed extensions projecting in the same direction from corresponding edges of the two members the same distance from the center line of the ridge, the second sheet metal member being narrower in overall width than the first whereby the longitudinal marginal edges of the first sheet extend beyond the marginal longitudinal edges of the second sheet, the said marginal edges of the two sheets having cooperating scales thereon for measuring relative movement between the two members, the point-forming extension on the second member being spaced inwardly from the end thereof a distance such that when the points of the two members are together the ends of the two members will be aligned.

2. A measuring instrument as defined in claim 1 in which there is a sheet metal measuring tool slidably received in the channel of dove-tailed section of the first member, said tool comprising a flat rectangular head portion having square sides slidably fitted into and retained in said dove-tailed channel, the head having a pointed probe at one end thereof that may be projected and retracted by sliding said tool in the channel in which it is received, and a scale in the groove over which the head portion of the tool moves, the head having a square end that registers with said last-named scale for measuring the extent of movement of the tool along the channel, the open face of the channel affording access to the head of said tool for moving it and rendering the said scale in the channel not covered by the tool visible.

3. The combination with a measuring instrument as defined in claim 1 of a removable carrying case comprising a rectangular sheet of metal of the same length as the sheets of which said first and second members of the tool are formed, said sheet having its longitudinal edges folded inwardly toward each other, but with the folded edges spaced from each other and with the folded portions spaced from the body of the sheet over which they are folded, the two folds being separated at their inner edges a distance corresponding substantially to the width of the base of the ridge of the said second member and the distance from the inner edge of one fold to the point of actual folding of the metal being slightly greater than the distance from the center of said ridges to the tips of the points of said two members, the distance from the inner edge of the one fold to the actual fold line of the metal being slightly greater than the distance from the center line of the first of said two members to the straight edge thereof whereby the tool may be slid lengthwise into the casing with the edges of the folds engaging each side of the base of the ridge of the second member with the points being sheathed beneath the wider of said two folds.

References Cited in the file of this patent

UNITED STATES PATENTS

D. 136,395     Deckman _____ Sept. 21, 1943

(Other references on following page)

UNITED STATES PATENTS

| | | |
|---|---|---|
| D. 167,043 | Kintz | June 17, 1952 |
| 1,194,749 | Kirk | Aug. 15, 1916 |
| 1,291,742 | Bousquet | Jan. 21, 1919 |
| 1,453,876 | Hunter | May 1, 1923 |
| 1,594,759 | Schweinert | Aug. 3, 1926 |
| 1,623,897 | Williams | Apr. 5, 1927 |
| 1,655,429 | Mayhew | Jan. 10, 1928 |
| 2,073,421 | Komorous | Mar. 9, 1937 |
| 2,270,227 | Swanson et al. | Jan. 13, 1942 |
| 2,581,778 | Young | Jan. 8, 1952 |
| 2,591,504 | Botts | Apr. 1, 1952 |
| 2,874,478 | Faulconer | Feb. 24, 1959 |

FOREIGN PATENTS

| | | |
|---|---|---|
| 216,574 | Germany | Feb. 10, 1909 |
| 360,433 | Italy | June 21, 1938 |
| 257,147 | Switzerland | Mar. 16, 1949 |